Aug. 1, 1961  W. J. HALL  2,994,362
FILM SPLICING
Filed June 18, 1957  2 Sheets-Sheet 2
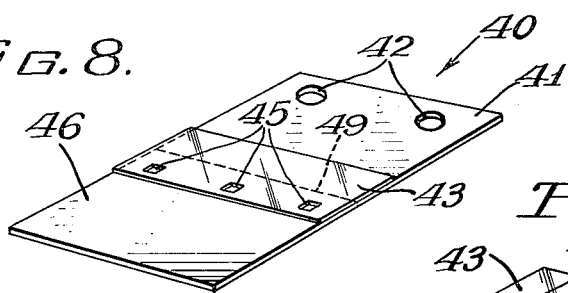
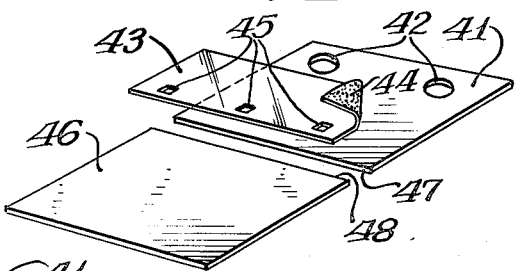
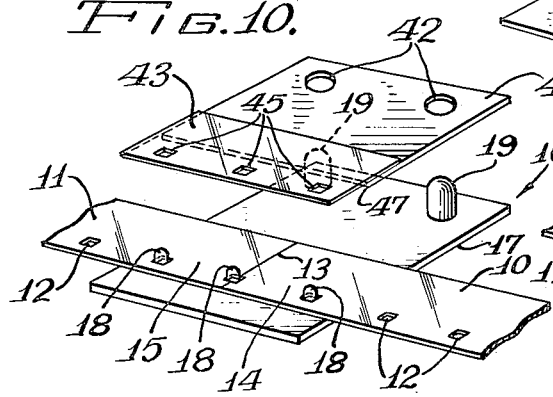
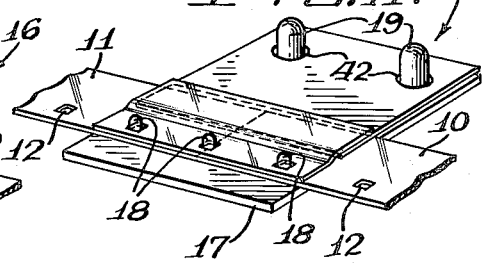
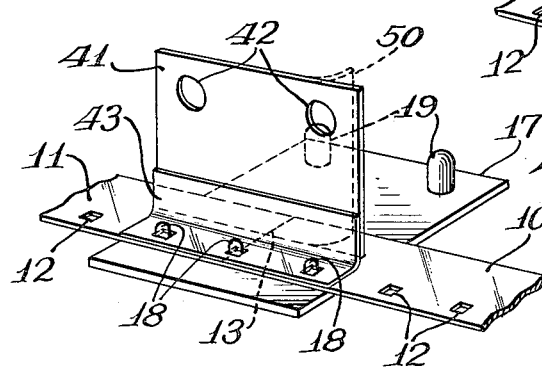
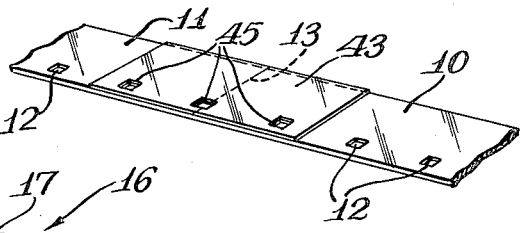
Inventor:
Walter J. Hall
By Robert F. Michle, Jr.  Atty.

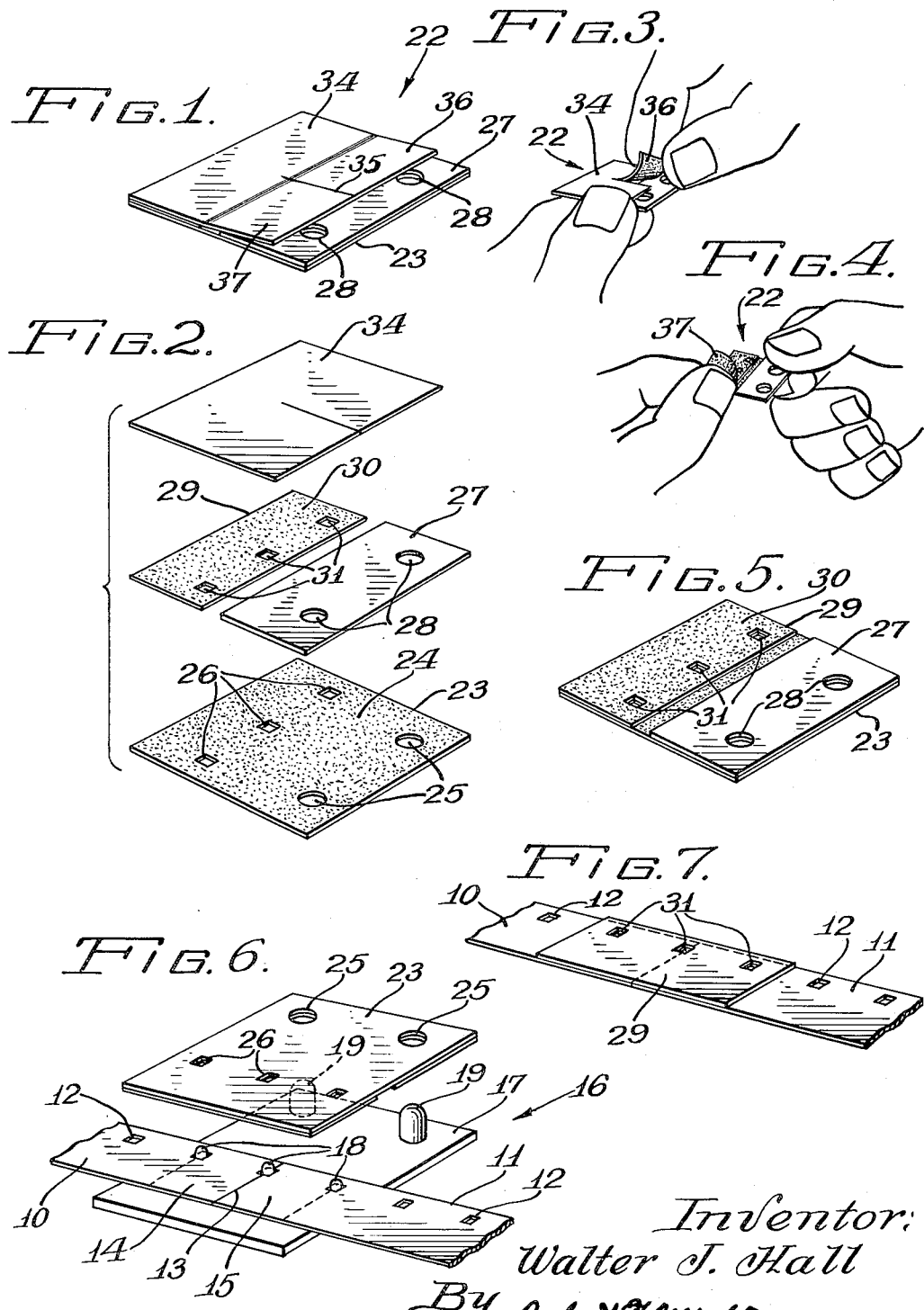

United States Patent Office 2,994,362
Patented Aug. 1, 1961

2,994,362
FILM SPLICING
Walter J. Hall, Chicago, Ill., assignor to Bell & Howell Company, Chicago, Ill., a corporation of Illinois
Filed June 18, 1957, Ser. No. 666,324
6 Claims. (Cl. 154—42.1)

This invention relates, generally, to splicing together juxtaposed ends of film strip and it has particular relation to an assembly for so doing.

Among the objects of the invention are: To provide a splicing member for the juxtaposed ends of film strip and mount the same in such manner that the splicing member can be applied where required; to employ a length of pressure sensitive tape for this purpose removably mounted on a backing member; to provide a removable protecting strip over the splicing member; to reinforce the backing member; and to provide for aligning the backing member and splicing member with respect to the ends of the film strip to be spliced.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth and the scope of the application of which will be indicated in the appended claims.

For a more complete understanding of the nature and scope of this invention reference can be had to the following detailed description, taken together with the accompanying drawings, in which:

FIGURE 1 is a perspective view of a splicing assembly constructed in accordance with this invention;

FIGURE 2 is a perspective view of the several elements making up the splicing assembly shown in FIGURE 1, the elements being shown in detached relation;

FIGURE 3 is a perspective view showing one of the first steps employed for removing the protecting strip;

FIGURE 4 is a perspective view showing the next step that may be employed in removing the protecting strip;

FIGURE 5 is a plan view of the splicing assembly with the protecting strip removed;

FIGURE 6 is a perspective view showing how the ends of the film strip to be spliced are positioned on a fixture and the splicing assembly with the protecting strip removed being placed in operative position;

FIGURE 7 is a perspective view of the ends of the film strip joined together by the splicing member;

FIGURE 8 is a perspective view of a modification of the splicing assembly embodying this invention;

FIGURE 9 is a perspective view of the several elements making up the assembly shown in FIGURE 8, the showing being in detached relation;

FIGURE 10 is a perspective view illustrating a first step in the application of the splicing assembly;

FIGURE 11 is a perspective view showing the next step in the application of the splicing assembly;

FIGURE 12 is a perspective view showing a third step in the application of the splicing assembly; and FIGURE 13 is a perspective view showing the juxtaposed ends of the film strip spliced together, this showing being the same as in FIGURE 7 except that the perforations are shown along the opposite side.

Referring now particularly to FIGURE 6 of the drawings, it will be observed that the ends of film strip to be spliced are indicated at 10 and 11. They are provided with apertures 12 in accordance with conventional practice for application to the sprocket or sprockets of a camera and a projector. The ends 10 and 11 are juxtaposed for splicing purposes and abut along line 13 at the edges of frames 14 and 15 of the respective ends 10 and 11. As here shown the ends 10 and 11 of the film strips to be spliced are positioned on a fixture that is indicated, generally, at 16 and comprises a flat base member 17 that may be formed of wood, metal, plastic or the like. Upstanding from the base member 17 are perforation studs 18 which are spaced apart to correspond to the spacing between the apertures 12 in the film strip. It will be noted that three perforation studs 18 are employed and that the central one is centered on the line 13 where the juxtaposed ends 10 and 11 of the film strip abut. The base member 17 also is provided with a pair of upstanding pilot studs 19 the purpose of which will be apparent presently.

Referring now to FIGURE 1 it will be observed that the reference character 22 designates, generally, a splicing assembly in which the present invention is embodied. The spicing assembly 22, as shown more clearly in FIGURE 2, includes a backing member 23 that is formed preferably of paperboard and has a length which is substantially greater than the width of the ends 10 and 11 of the film strip to be spliced. Also the backing member 23 has a width which is greater than the width of the two frames 14 and 15. The backing member 23 is covered with a layer of pressure sensitive adhesive as indicated at 24. It will be noted that the backing member 23 has a pair of apertures 25 and they are spaced so as to register with the pilot studs 19 on the base member 17. Overlying and secured to the backing member 23 along the edge where the apertures 25 are located is a reinforcement 27 which may have a length equal to the width of the backing member 23 and a width which is slightly less than half the length thereof. The reinforcement 27 may be formed of paperboard. It is provided with a pair of apertures 28 which register with the apertures 25 for receiving the pilot studs 19.

Along the other end of the backing member 23 is a splicing member 29. Preferably it is formed of transparent pressure sensitive tape and it has a pressure sensitive adhesive 30 thereon as indicated. Also it is provided with three apertures 31 which are arranged to register with the apertures 12 in the ends 10 and 11 of the film strip and also to register with the perforation studs 18.

With a view to protecting the pressure sensitive adhesive 30 on the splicing member 29 a protecting strip 34 of crepe paper or the like can be secured lightly thereto. It is split as indicated at 35 to provide sections 36 and 37 in order to facilitate removal.

It will be understood that the splicing assembly 22 preferably is formed from a long strip of the materials mentioned and that it is cut to the proper width to overlie the two frames 14 and 15. For different widths of film strip different splicing assemblies 22 are employed having the width of the splicing member 29 proportioned to the width of the film strip to be spliced.

In operation, as shown in FIGURE 3, the splicing assembly 22 is held in the left hand while the right hand, particularly the forefinger and thumb, grasps the section 36 therebetween and lifts it away from the reinforcement 27. In this way about one-half of the protecting strip 34 is removed. Then the remaining portion of the splicing assembly 22 is gripped between the forefinger and thumb of the right hand, as indicated in FIGURE 4, while the other section 35 is grasped between the forefinger and thumb of the left hand and is removed.

After the protecting strip 34 has been removed, the remaining assembly appears as illustrated in FIGURE 5 and it is ready for application to the fixture 16 to perform the splicing operation. As shown in FIGURE 6, the splicing assembly 22, with the protecting strip 34 removed, is turned upside down and the pairs of apertures 25 and 28 in the backing member 23 and reinforcement 27 are placed in registry with the pilot studs 19. They extend above the upper surface of the flat base member 17 further than do the perforation studs 18. Accordingly, they guide the splicing assembly into splicing position where the splicing member 29 overlies the two frames 14 and 15 and its apertures 31 register with the apertures 12 in the ends 10 and 11 of the film strip and with the perforation studs 18.

Sufficient pressure is applied to the upper surface of the backing member 23 as it appears in FIGURE 6 to cause the pressure sensitive adhesive surface 30 to adhere firmly to the upper surface of the juxtaposed ends 10 and 11 of the film strip. Then the backing member 23 is peeled off of the splicing member 29. The spliced ends 10 and 11 of the film strip then appear as illustrated in FIGURE 7. Since the splicing member 29 is of the same width as the ends 10 and 11, it is unnecessary to cut or otherwise modify it after the backing member 23 has been peeled away as described.

Another embodiment of the invention and the manner in which it is used for splicing together the juxtaposed ends of perforated film strip is illustrated in FIGURES 8–13. Referring first to FIGURES 8 and 9 it will be observed that the splicing assembly is illustrated, generally, at 40 and that it includes a backing member 41 of paperboard the length of which is at least equal to the width of the film strip the ends of which are indicated at 10 and 11. Preferably it is substantially longer than the width of the film strip and the backing member 41 has a width at least equal to the width of two frames 14 and 15 of the film strip. In order to accurately position the backing member 41 on the fixture 16 it is provided with apertures 42 along one end for interfitting with the pilot studs 19.

Along the other end of the backing member 41 is a pressure sensitive splicing member 43 having a pressure sensitive surface 44 on one side as shown in FIGURE 9. The splicing member 43 is provided with three apertures 45 which are arranged to interfit with the perforation studs 18 on the fixture 16 and to register with the corresponding three apertures 12 in the frames 14 and 15.

Underlying the splicing member 43 is a protecting strip 46 which may be formed of paperboard and which constitutes an endwise extension of the backing member 41. It may be of the same size and shape. The backing member 41 and protecting strip 46 are positioned with their juxtaposed edges 47 and 48 substantially midway between the edges of the splicing member 43 as indicated by the broken line 49 in FIGURE 8.

The splicing assembly 40 can be formed from relatively long strips of backing member 41, splicing member 43 and protecting strip 46. The relatively long strips can be cut to provide the configuration shown in FIGURE 8 as will be understood readily.

When it is desired to splice together the ends 10 and 11 of a film strip, they are positioned on the fixture 16 as shown in FIGURE 10. Here it will be observed that the perforation studs 18 are spaced further away from the pilot studs 19 than is the case for the fixture 16 shown in FIGURE 6. The ends 10 and 11 are positioned on the fixture 16 with their apertures 12 registering over the perforation studs 18. This insures that the ends 10 and 11 are positioned accurately.

The protecting strip 46 is removed from underneath the splicing member 43 so that it alone is left on the backing member 41 as shown in FIGURE 10. Substantially half of the splicing member 43 projects beyond the edge 47 of the backing member 41.

As illustrated in FIGURE 10 the backing member 41 is positioned so that the apertures 42 register with the pilot studs 19 while the three apertures 45 in the splicing member 43 register with the perforation studs 18. This assembly is moved downwardly to the position shown in FIGURE 11 where the pilot studs 19 project upwardly through the apertures 43 while the perforation studs 18 extend upwardly not only through the apertures 12 in the film ends 10 and 11 but also above the apertures 45 in the splicing member 43. That portion of the splicing member 43 then is pressed into intimate contact engagement with the juxtaposed upper surfaces of the ends 10 and 11 and a partial splice is provided.

Next, as shown in FIGURE 12, the backing member 41 is swung upwardly away from the pilot studs 19. Then, as indicated at 50, one edge is curled away from the splicing member 43. After the backing member 41 has been completely detached from the splicing member 43, the remaining portion of the latter is moved into intimate contact engagement with the upper surfaces of the ends 10 and 11 of the film strip to the position shown in FIGURE 13. The splicing is then complete.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Means for splicing the juxtaposed ends of film strip perforated along one edge comprising a paperboard backing member having a length substantially greater than the width of the film strip to be spliced and a width greater than two frames thereof and provided with perforations spaced from one end registrable with perforations in the film strip, a paperboard reinforcement secured to one side of said backing member along the other end thereof, and a pressure sensitive splicing member removably carried by said one side of said backing member along said one end having apertures registering with said apertures therein for securement to said juxtaposed ends of said film strip and subsequent removal from said backing member, said backing member and reinforcement having registering pairs of apertures for cooperating with studs of a fixture to locate said backing member in fixed relation to the film ends to be spliced.

2. Means for splicing the juxtaposed ends of film strip perforated along one edge with the perforations interfitting with perforation studs of a fixture comprising a paperboard backing member having a length substantially greater than the width of the film strip to be spliced and a width greater than two frames thereof and provided with perforations spaced from one end registrable with perforations in the film strip and with said perforation studs on said fixture, a paperboard reinforcement secured to one side of said backing member along the other end thereof, and a pressure sensitive splicing member removably carried by said one side of said backing member along said one end having apertures registering with said apertures therein and with said perforation studs for securement to said juxtaposed ends of said film strip and subsequent removal from said backing member, said backing member and reinforcement having registering pairs of apertures for cooperating with pilot studs of said fixture to locate said backing member in fixed relation to the film ends to be spliced.

3. Means for splicing the juxtaposed ends of perforated film strip comprising a backing member having a length at least equal to the width of the film to be spliced and a width at least equal to two frames thereof, and a pressure sensitive splicing member removably carried by said backing member along one end having apertures for registering with perforations in the film strip for securement to said juxtaposed ends thereof and subsequent removal from said backing member, the other end of said backing member extending beyond one edge of said splicing member and having a pair of apertures for cooperating with studs of a fixture to locate said backing member in fixed relation to the film ends to be spliced.

4. Means for splicing the juxtaposed ends of perforated film strip with the perforations interfitting with perforation studs of a fixture comprising a backing member having a length at least equal to the width of the film to be spliced and a width at least equal to two frames thereof, and a pressure sensitive splicing member removably carried by said backing member along one end having apertures for registering with perforations in the film strip and with said perforation studs of a fixture for securement to said juxtaposed ends thereof and subsequent removal from said backing member, the other end of said backing member extending beyond one edge of said splicing member and having a pair of apertures for cooperating with pilot studs of said fixture to locate said backing member in fixed relation to the film ends to be spliced.

5. Means for splicing the juxtaposed ends of perforated film strip with the perforations interfitting with perforation studs of a fixture comprising a backing member having a length at least equal to the width of the film to be spliced and a width at least equal to two frames thereof, a pressure sensitive splicing member removably carried by said backing member along one end having apertures for registering with perforations in the film strip and with said perforation studs for securement to said juxtaposed ends thereof and subsequent removal from said backing member, the other end of said backing member extending beyond one edge of said splicing member and having a pair of apertures for cooperating with pilot studs of said fixture to locate said backing member in fixed relation to the film ends to be spliced; and a protecting strip overlying a portion of said pressure sensitive member, removable therefrom prior to application to said perforation studs to permit application to said juxtaposed ends of said film strip, and constituting an endwise extension of said backing member.

6. The invention as set forth in claim 5 wherein the edges of the backing member and protecting strip are juxtaposed midway the edges of the pressure sensitive splicing member.

References Cited in the file of this patent

UNITED STATES PATENTS

| | | |
|---|---|---|
| 2,506,933 | Mercer | May 9, 1950 |
| 2,547,487 | Penney | Apr. 3, 1951 |
| 2,591,779 | Buck | Apr. 8, 1952 |
| 2,596,179 | Seymour | May 13, 1952 |
| 2,805,183 | Higgins | Sept. 3, 1957 |